United States Patent
Jordan et al.

(10) Patent No.: US 8,017,258 B2
(45) Date of Patent: Sep. 13, 2011

(54) SYSTEM AND METHOD FOR ENHANCED INFORMATION HANDLING SYSTEM BATTERY SAFETY

(75) Inventors: Jonathan Jordan, Round Rock, TX (US); Jack Burns, Leander, TX (US); James Davis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 12/955,213

(22) Filed: Nov. 29, 2010

(65) Prior Publication Data

US 2011/0070470 A1     Mar. 24, 2011

Related U.S. Application Data

(62) Division of application No. 11/685,262, filed on Mar. 13, 2007, now Pat. No. 7,851,077.

(51) Int. Cl.
*H01M 2/12* (2006.01)

(52) U.S. Cl. ............... 429/53; 429/72; 429/82

(58) Field of Classification Search ............ None
See application file for complete search history.

(56) References Cited

U.S. PATENT DOCUMENTS

| | | | |
|---|---|---|---|
| 2,971,045 | A | 2/1961 | August |
| 4,317,868 | A | 3/1982 | Spiegelberg |
| 5,623,390 | A | 4/1997 | Noda et al. |
| 6,497,978 | B1 | 12/2002 | Takada et al. |
| 6,555,263 | B1 | 4/2003 | Kim et al. |
| 6,632,559 | B1 | 10/2003 | Kawamura et al. |
| 6,730,430 | B2 | 5/2004 | Chang |
| 6,746,795 | B2 | 6/2004 | Schwarz |

*Primary Examiner* — Ula C. Ruddock
*Assistant Examiner* — Tony Chuo
(74) *Attorney, Agent, or Firm* — Hamilton & Terrile, LLP; Robert W. Holland

(57) ABSTRACT

Enhanced safety is provided in the event of an information handling system catastrophic battery failure by extending a flame container outward from the battery to vent flammable gases through holes having a quenching distance that retards transfer of flames from the battery. For example, telescoping cylinder sections disposed proximate the casing of a battery cell are forced outward as a telescoping assembly when pressure within the casing exceeds a predetermined safety threshold. The flame container vents flammable gases away from other cells of the battery and may direct the vented gases to the exterior of an information handling system housing or to the interior of the housing.

12 Claims, 6 Drawing Sheets

SYSTEM AND METHOD FOR ENHANCED INFORMATION HANDLING SYSTEM BATTERY SAFETY

This application is a divisional of application Ser. No. 11/685,262, filed Mar. 13, 2007 now U.S. Pat. No. 7,851,077, entitled "System and Method for Enhanced Information Handling System Battery Safety" and naming Jonathan Jordan, Jack Burns, James Davis as inventors, which is hereby incorporated by reference in its entirety.

BACKGROUND OF THE INVENTION

1. Field of the Invention

The present invention relates in general to the field of information handling system batteries, and more particularly to a system and method for enhanced information handling system battery safety.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system that has gained increasing acceptance among end users is the portable information handling system. Portable information handling systems have a chassis sized to allow end user mobility while the system is operating. Portable information handling systems typically include all of the components necessary for performance of desired end user functions built within the chassis. For example, a typical portable information handling system includes a CPU, memory, a hard disk drive and a chipset to coordinate the processing of information, the same components typically found in desktop and tower information handling systems; however, portable information handling systems also include an integrated display, such as an LCD integrated in a rotationally coupled lid, and an internal power supply, such as a rechargeable battery. By including a display and a battery, portable information handling system operate independent of a fixed location assets, such as a peripheral display and a power outlet. This gives end users tremendous flexibility to operate portable information handling systems in a variety of locations limited only by the need to recharge the battery when the battery charge runs low.

Portable information handling systems have grown increasingly attractive to end users in part because the components used to build portable systems have steadily grown in capabilities. One difficulty with using more powerful components in portable information handling systems is that greater component capabilities generally mean greater component power consumption. Increased power consumption generally means that portable information handling systems need more powerful internal batteries in order to provide a reasonable amount of time between battery charges. Although information handling system batteries are usually quite safe, they do tend to include materials that have the potential to cause potentially dangerous chemical reactions. For this reason, information handling system batteries typically include a variety of safety devices to help prevent catastrophic failures, such as battery management units (BMUs). In the event that a catastrophic failure does occur, such as where a short develops between a battery cell's cathode and anode, information handling system batteries also include physical safety systems to help manage danger from the failure. For instance, a current interrupt device (CID) in each battery cell opens if pressure within the cell reaches a predetermined limit to cut off current to the cell. If pressure in the cell continues to rise, a vent opens to release the pressure to help prevent development of an explosive force. Unfortunately, gases that typically develop during a catastrophic failure of a battery cell may result in flames developing as the venting occurs.

SUMMARY OF THE INVENTION

Therefore a need has arisen for a system and method which helps limit dangers related to flames resulting from a catastrophic battery failure.

In accordance with the present invention, a system and method are provided which substantially reduce the disadvantages and problems associated with previous methods and systems for limiting dangers related to flames resulting from a catastrophic battery failure. A flame container associated with a battery extends outward from the battery in the event of an over pressure so that pressure from within battery vents through the extended flame container. Quenching holes formed in the flame container have holes with a diameter smaller than the quenching distance so that flames associated with venting pressure are restrained in the flame container.

More specifically, a battery package has plural battery cells, each cell having battery material contained in a casing. If a catastrophic failure occurs in a casing, the battery material may become a combustible fuel having an associated quenching distance. A flame container associated with each battery cell casing includes quenching holes of the quenching distance or less so that fire from the combustible fuel is restrained from passing through the quenching holes. Over pressure related to a catastrophic failure forces the flame container outward from the casing to expose the quenching holes, which allows venting through the quenching holes of pressure built up in the casing. For an information handling system battery, perforated sections formed in the battery package and the information handling system housing allow the flame container to extend outward from the information handling system to vent overpressure. Alternatively, the flame container may extend from the battery package into the interior of the information handling system to have the housing help contain the vented materials.

The present invention provides a number of important technical advantages. One example of an important technical advantage is that flames resulting from catastrophic battery failure are better managed to reduce the dangers associated with a catastrophic battery failure. In the event of a catastrophic battery cell failure, the flame container extends outward from a battery package to vent flammable gases away from adjacent battery cells. Holes formed in the flame container are sized to retard flames so that, in the event that venting gases catch on fire, flames are maintained within the flame container to reduce the risk of damage from the fire. The flame container adds minimal material to the battery package so that battery size and weight constraints are minimally impacted.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system battery failure is managed by extending a flame container from a failed battery cell to vent flammable gas through holes having a diameter smaller than the quenching distance for the battery material. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
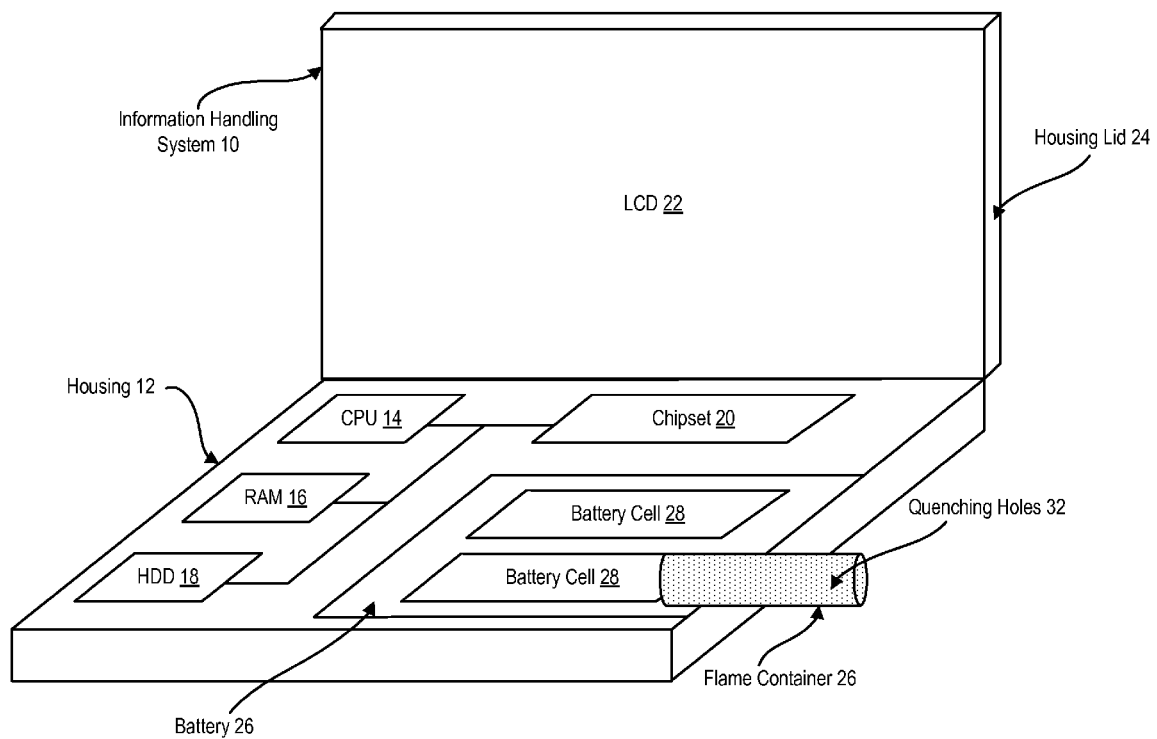
FIG. 1 depicts a block diagram of a portable information system having a battery with a flame container to manage catastrophic failure of a battery cell.

Referring now to FIG. 1, a block diagram depicts a portable information system 10 having a battery with a flame container to manage catastrophic failure of a battery cell. Portable information handling system 10 has a housing 12 that contains processing components operable to process information, such as a CPU 14, a RAM 16, a HDD 18, a chipset 20 and an LCD 22 disposed in a rotationally-hinged lid 24. Housing 12 is sized to allow portability of information handling system 10 with integrated LCD 22 allowing end users to view information processed by the processing components while mobile. To provide power to the processing components, an internal rechargeable battery 26 is integrated with housing 12. Battery 26 has plural cells 28 that store a charge from an external power source for use by the processing components when information handling system 10 is disconnected from the external power source. Each battery cell 28 includes materials that, in the event of a physical failure of a cell, can generate flammable gases. In order to better manage a catastrophic failure within a cell 28, a flame container 30 extends from the cell 28 in response to a pressure build-up within the cell 28 so that gases are vented through quenching holes 32 having a diameter smaller than the quenching distance for the battery material. In the embodiment depicted by FIG. 1, flame container 30 extends outward from the interior of housing 12 to the exterior of housing 12 so that gases are vented to the exterior. In an alternative embodiment, flame container 30 may extend from battery 26 into the interior of housing 12 so that housing 12 helps to contain the venting gases.

Figure 2:
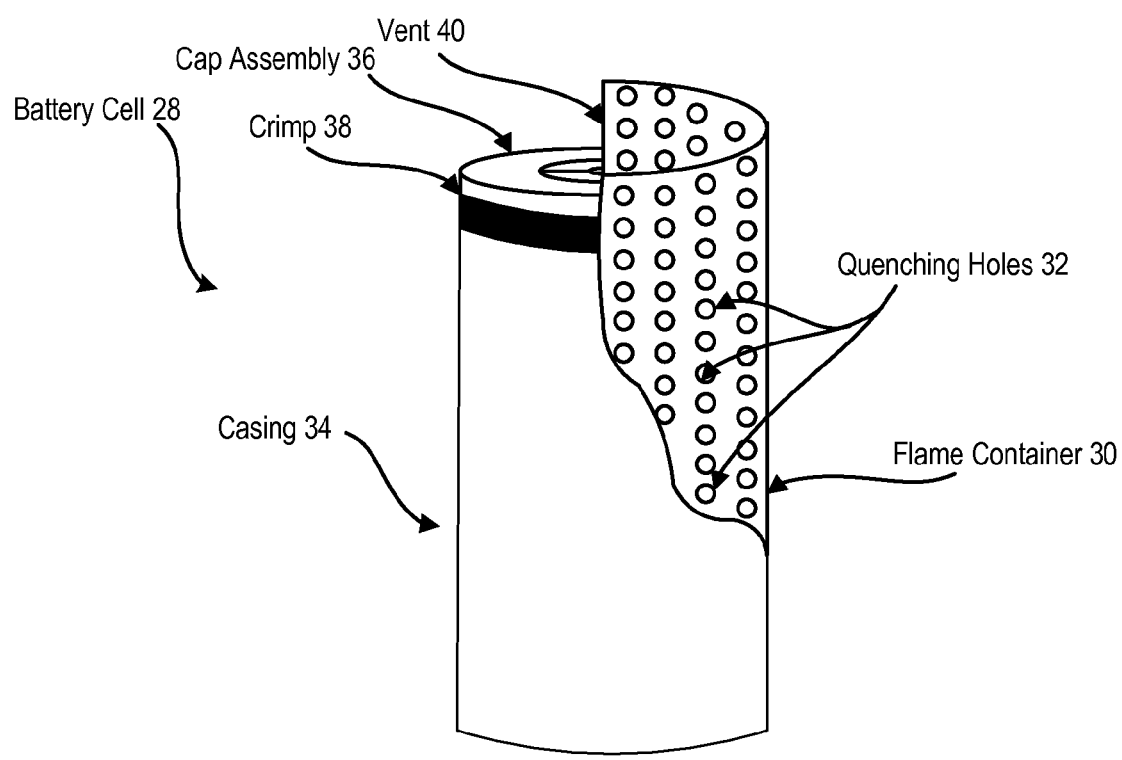
FIG. 2 depicts a side cut away view of a battery cell having a flame container.

Referring now to FIG. 2, a side cut away view depicts a battery cell 28 having a flame container 30. Battery cell 28 contains battery materials within a casing 34 enclosed by a cap assembly 36 held in place with a crimp 38. A vent 40 illustrates conventional venting of excessive pressure built up within casing 34 through an opening in cap assembly 36. Flame container 30 is a cylinder of non-flammable material, such as a ceramic, heat resistant fiber like Kevlar, or perforated metal, which slides along the outside surface of casing 34 and has openings with a diameter smaller than the quenching distance for the battery material. When pressure within casing 34 reaches a predetermined safety threshold, pressure vent 40 gives way to release the pressurized material from within casing 34 into flame container 30. The entry of pressurized material into flame container 30 causes flame container 30 to slide relative to casing 34. Pressure within flame container 30 vents through quenching holes 32 having a diameter smaller than the quenching distance for the battery material. The quenching distance of quenching holes 32 is based upon the type of flammable material (i.e., the fuel) released by a catastrophic failure of battery material within casing 34, and is the distance that prevents fire or flames from passing from the interior to the exterior of flame container 30.

Figure 3:
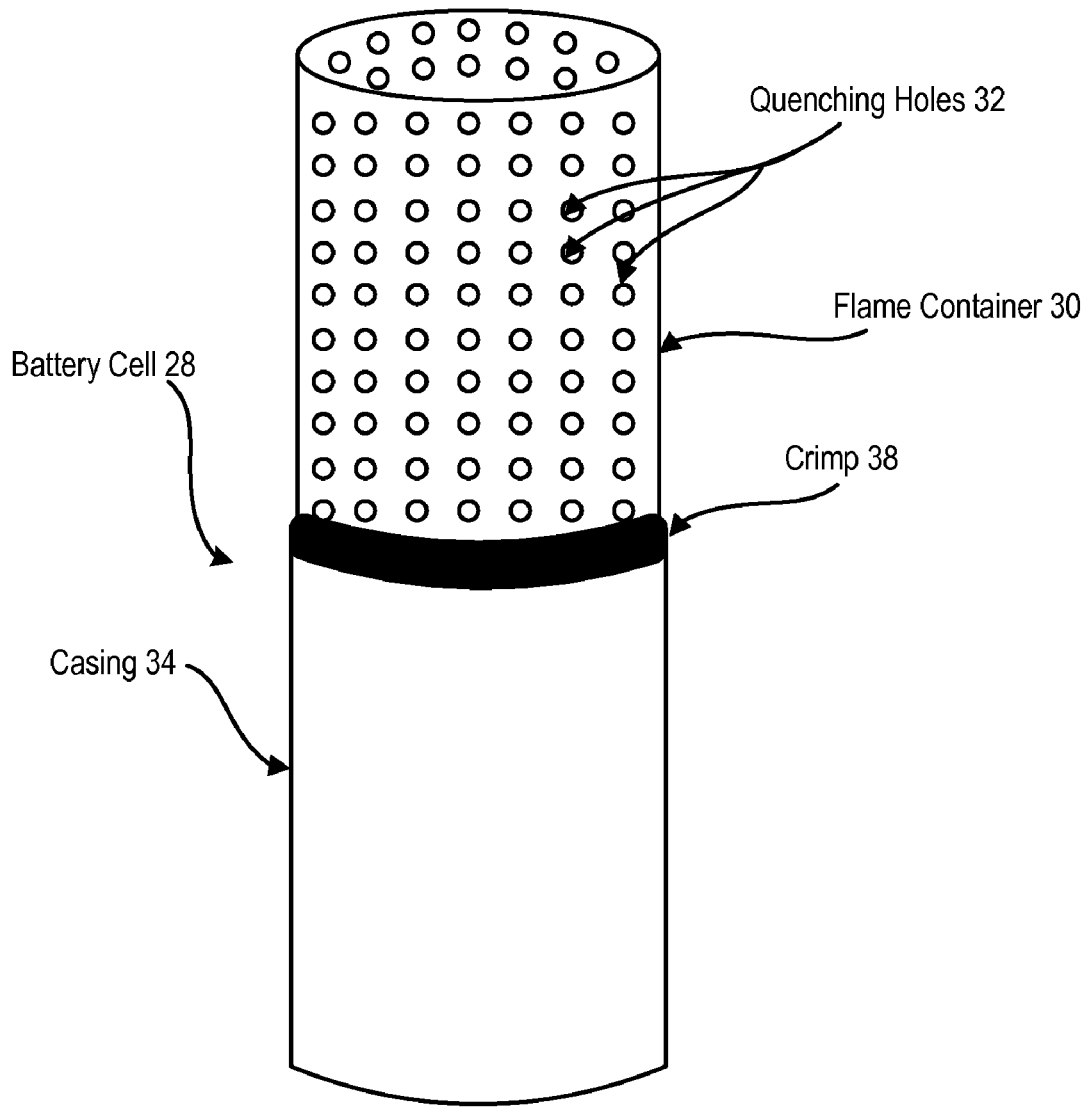
FIG. 3 depicts a side view of a battery cell having an extended flame container.

Referring now to FIG. 3, a side view depicts a battery cell 28 having an extended flame container 30. An over pressure event in casing 34 vents into flame container 30 so that the pressure forces flame container 30 to slidingly extend along the outer surface of casing 34. A catch located in flame container 30 prevents flame container 30 from completely separating from casing 34, such as by catching onto crimp 38 during the sliding motion of flame container 30 relative to casing 34. As flame container 30 extends outward from casing 34, quenching holes 32 are exposed to vent over pressurized gases within casing 34 to the exterior of casing 34 through openings having a diameter smaller than the quenching distance for the battery material. Since quenching holes 34 have openings of a quenching distance or less for potential fuels within casing 34, flames that might be initiated by catastrophic battery cell failure are retarded from escaping, thus reducing the risk of a fire traveling from within casing 34 to outside casing 34. In the embodiment depicted by FIG. 3, flame container 30 is a single cylinder that extends outward from casing 34 to vent gases.

Figure 4:
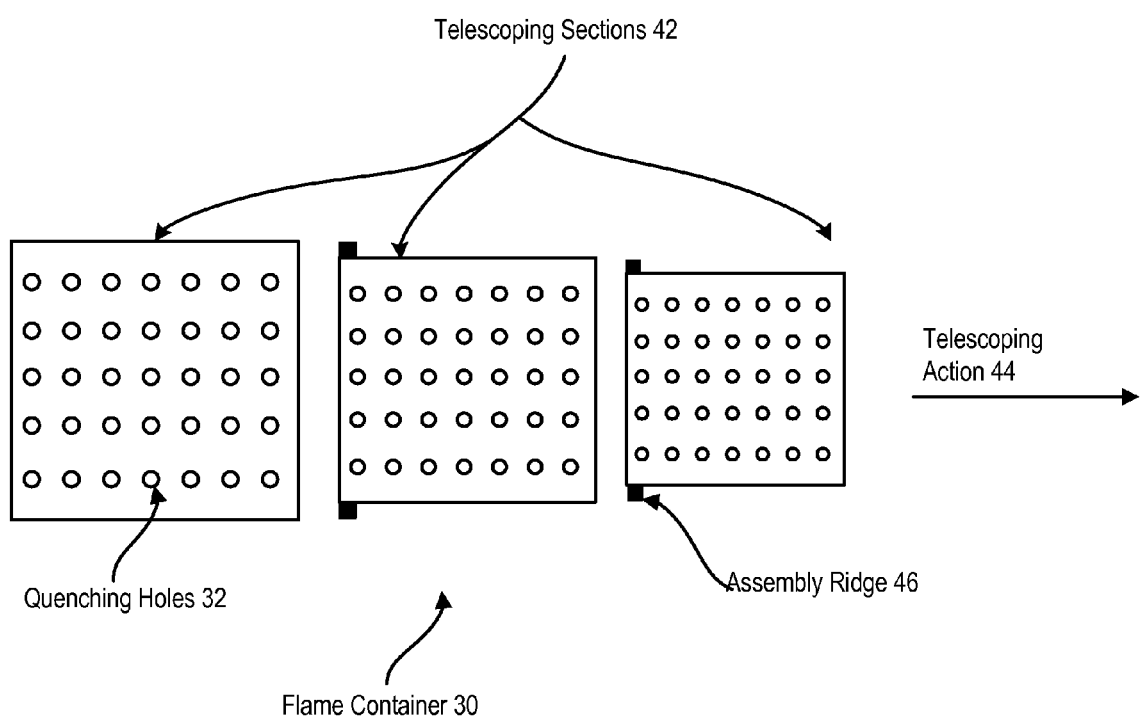
FIG. 4 depicts a side blow-up view of a flame container having a telescoping assembly.

Referring now to FIG. 4, a side blow-up view depicts a flame container 30 having a telescoping assembly. Flame container 30 is built from plural telescoping sections 42 that slidingly fit into each other to a compressed telescoping assembly. Upon an over pressure event, a telescoping action 44 caused by the pressure extends the telescoping sections 42 from a compressed to a telescoped position. Assembly ridges 46 built into the telescoping sections 42 having smaller diameters extend to engage the larger diameter of an adjacent telescoping section 42 to hold the telescoping sections together in a single assembly during the telescoping action 44. By compressing telescoping sections 42 at the portion of casing 34 proximate to vent 40, flame container 30 takes up minimal space until an over pressure event causes telescoping action 44. Further, the use of a telescoping assembly permits flame container 30 to have an extended length that is greater than the length of casing 34.

Figure 5:
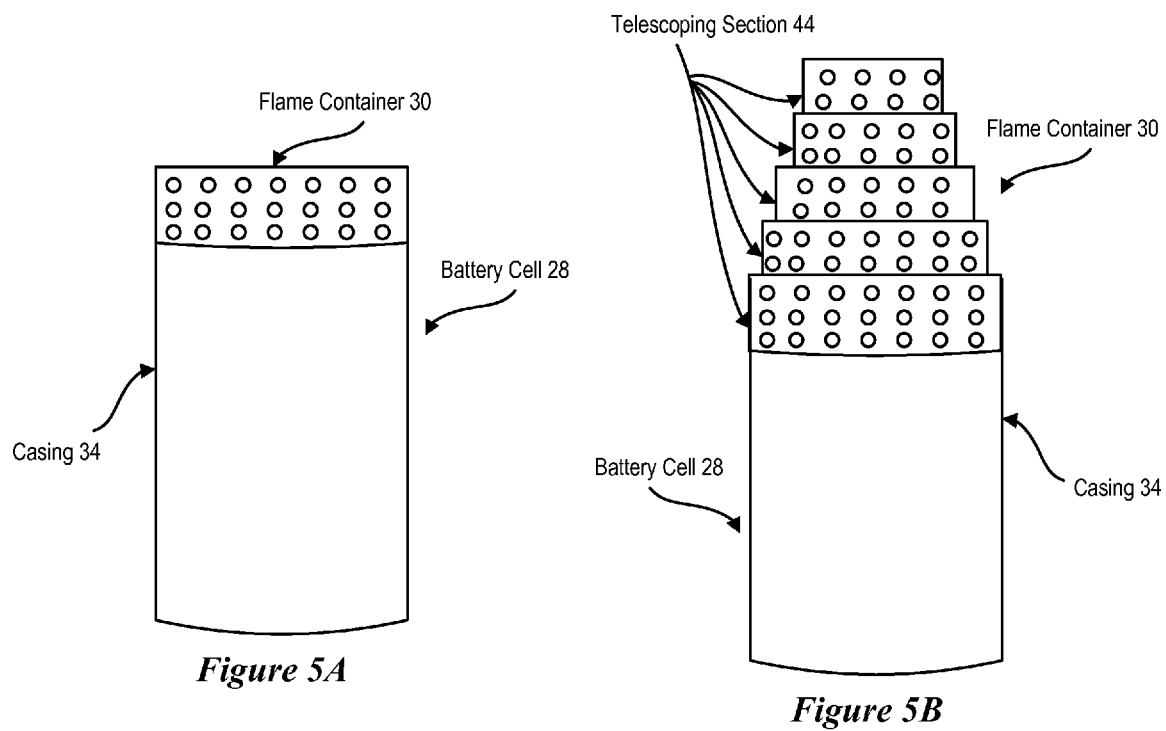
FIGS. 5A and 5B depict a telescoping flame container coupled to a battery cell in retracted and extended positions.

Referring now to FIGS. 5A and 5B, a flame container 30 coupled to a casing 34 of a battery cell 28 is depicted. In FIG. 5A, a telescoping flame container 30 couples to the portion of casing 34 proximate vent 40 of battery cell 28. The telescoping sections 42 are compressed into a single assembly that has a minimal footprint. Upon release of pressure from an over pressure event through vent 40, the pressure causes the telescoping action 44 to extend flame container 30 outward from casing 34. As the telescoping action extends the telescoping sections, quenching holes 32 are exposed to provide venting of battery material while suppressing flames within flame container 30.

Figure 6:
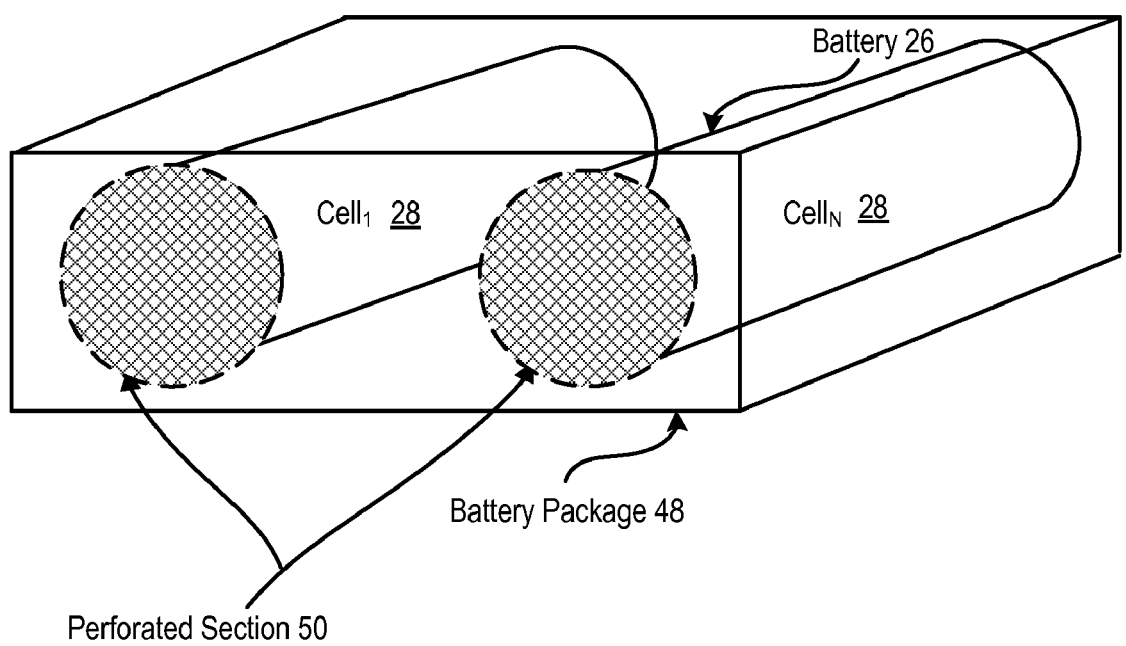
FIG. 6 depicts a side view of a battery package having perforated sections to pass the flame container.

Referring now to FIG. 6, a side view depicts a battery package 48 having perforated sections 50 to pass the flame container. Battery package 48 includes an exterior housing that supports plural battery cells 28 with each battery cell aligned with a perforated section 50. During an over pressure event, the flame container is forced through perforated section 50 so that gases vented through the quenching holes are vented outside of battery package 48. Venting out of a flame container that extends outward from battery package 48 reduces the risk that fire from a catastrophic failure associated with a battery cell 28 will spread to other battery cells 28.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having an interior and an exterior;
   plural processing components disposed in the housing interior and operable to process information;
   a battery disposed in the housing and operable to power the processing components, the battery having plural cells, each cell secured in a casing; and
   a flame container associated with each battery cell, the flame container operable to extend outward from the battery cell if a predetermined pressure occurs in the cell to vent the pressure from the cell.

2. The information handling system of claim 1 wherein the flame container has plural quenching holes to vent pressure from the cell, the quenching holes sized to less than a quenching distance associated with a flammable material disposed in the cell.

3. The information handling system of claim 1 wherein the flame container is further operable to extend outward from the battery cell and into the housing interior.

4. The information handling system of claim 1 wherein the flame container is further operable to extend outward from the battery cell and out of the housing interior to the housing exterior.

5. The information handling system of claim 1 wherein the flame container comprises a cylinder disposed at the outside surface of each battery cell casing, the cylinder sliding along the casing to extend from the battery cell in response to the predetermined pressure.

6. The information handling system of claim 1 wherein the flame container comprises plural sections disposed in a telescoping arrangement coupled to the casing.

7. The information handling system of claim 1 wherein the flame container comprises heat resistant fiber.

8. The information handling system of claim 1 wherein the flame container comprises ceramic.

9. A battery comprising:
   plural cells, each cell having a casing, the casing enclosing flammable material; and
   a flame container disposed proximate each casing, the flame container operable to extend out from the casing if a predetermined pressure occurs within the casing, the flame container having plural openings to vent the pressure.

10. The battery of claim 9 wherein the flame container openings are sized to a quench distance associated with the flammable material, the quench distance associated with the retarding of flames from venting through the openings.

11. The battery of claim 9 further comprising a package encasing the plural cells, the package having a perforated section proximate each cell, the perforated section operable to allow the flame container to pass through to the exterior of the package.

12. The battery of claim 9 wherein the flame container comprises plural sections stored compressed in a telescope assembly, the plural sections extending by telescoping outward from the casing.

* * * * *